United States Patent [19]

Esterowitz et al.

[11] Patent Number: 5,038,353
[45] Date of Patent: Aug. 6, 1991

[54] METHOD AND APPARATUS FOR LASING

[75] Inventors: Leon Esterowitz, Springfield; Roger E. Allen, Alexandria, both of Va.; Gregory J. Kintz, Mountain View, Calif.

[73] Assignee: The United States of America as represented by the Secretary of the Navy, Washington, D.C.

[21] Appl. No.: 488,411

[22] Filed: Feb. 21, 1990

Related U.S. Application Data

[63] Continuation of Ser. No. 199,817, May 27, 1988, abandoned.

[51] Int. Cl.$^5$ ............................................. H01S 3/16
[52] U.S. Cl. ......................................... 372/41; 372/68
[58] Field of Search .................... 372/41, 68, 75, 101

[56] References Cited

U.S. PATENT DOCUMENTS

| | | | |
|---|---|---|---|
| 3,405,371 | 10/1968 | Johnson et al. | 372/41 |
| 3,480,877 | 11/1969 | Dillon et al. | 372/41 |
| 4,321,559 | 3/1982 | Esterowitz et al. | 372/41 |
| 4,701,928 | 10/1987 | Fan et al. | 372/68 |

OTHER PUBLICATIONS

Fan et al., CLEO Technical Digest, FL1, Apr. 26–May 1, 1987, Baltimore, MD, "Continuous-Wave Diode-Laser-Pumped 2 $\mu$m Ho:YAG ...", p. 344.
Kintz et al., CLEO Technical Digest Book of Post Deadline Papers; Apr. 26–May 1, 1987, Baltimore, MD, "Two for One Photon Conversion Observed in Alexandrite ...", pp. 266–267.
Johnson et al., "Coherent Oscillations—YAG"; Appl. Phys. Lett., vol. 7, No. 5, 09/01/1965; pp. 127–129.
Chicklis et al.; "Stimulated Emission—Comparison"; IEEE J. of Q. Elec., vol. QE-8, No. 2; 02/1972; pp. 225–230.
Caird et al.; "Analysis of Laser—Materials", IEEE J. of Q. Elec., vol. QE-11, No. 3, 03/1975; pp. 97–99.
Antipenko et al., "Frequency Conversion—Tm$^{3t}$ and Ho$^{3t}$ ions"; Sov. J. Quantum Electron., vol. 7, No. 5, 05/1977, pp. 633–634.
Kaminskii et al., "New Functional Scheme for 3-$\mu$ Crystal Lasers", Sov. Phys. Dokl., vol. 24, No. 5, 05/1979; pp. 363–364.
Bingkun Zhou et al., "Efficient, —Nd:YAG Laser", Optics Letters, vol. 10, No. 2, 02/1985, pp. 62–63.
Esterowitz et al., "CW Diode Pumped . . .," Electronics Letters, Jun. 4, 1987.
R. Allen et al., "Diode Pumped 2 Micrometer Holmium Laser," Electronics Letters, vol. 22, No. 18 (1986).
"Patents & Applications," Photonics Spectra, p. 186 (May 1989).
Y. T. Fan et al., "Continuous-Wave Operation at 2.1 Micrometers of a Diode-Laser-Pumped Tm-Sensitized Ho:YAlO Laser at 300k," Optics Letters, vol. 12, No. 9 (Sep. 1987).
H. Hemmati, "Efficient Holmium:Yttrium Lithium Fluoride Laser Longitudinally Pumped by a Semiconductor Laser Array," Applied Physics Letters, 51 (8) (Aug. 24, 1987).

Primary Examiner—Frank Gonzalez
Attorney, Agent, or Firm—Thomas E. McDonnell; Edward F. Miles

[57] ABSTRACT

A laser system employing thulium and holmium in a trivalent state. The quantum levels of interest in the thulium and holmium are coupled so that one pumping photo absorbed by the thulium results in two photons emitted by the holmium, making for an unusually efficient laser system. The lower level is sufficiently depopulated at room temperature to allow laser operation without cryogenics. In preferred embodiments, the laser pump can be a laser diode, itself especially efficient, and whose output frequency is closely matched in photon energy to the thulium quantum state of interest, thus lending additional efficiency to the overall system. The thulium and the holmium exist in an yttrium-aluminum garnet crystal as lattice replacements for yttrium.

16 Claims, 1 Drawing Sheet

METHOD AND APPARATUS FOR LASING

This is a continuation of application Ser. No. 07/199,817 filed May 27, 1988 (now abandoned).

BACKGROUND OF THE INVENTION

The invention pertains to general systems for producing laser radiation.

Lasers have broad application in optics and communication. Unfortunately, many lasers have several inherent sources of inefficiency and inconvenience. Incoherent laser pumps tend to be very energy inefficient, being able to deliver only a small fraction of their input power to the laser sample (target) itself. Moreover, what energy does reach the laser target from the excitation source is rarely well matched to the quantum transitions upon which the laser system is based, thereby wasting a great deal more energy. Finally, many laser systems whose terminal state is the ground manifold typically require cooling of the laser sample so as to insure that the lower laser levels are depopulated prior to pumping. Such cryogenics are costly and bulky.

SUMMARY OF THE INVENTION

Accordingly, an object of the invention is to provide a laser system of inherently high efficiency.

Another object of the invention is to produce such high efficiency by using a laser pump that is itself of very high efficiency.

Another object of the invention is to produce such a system whose relevent quantum states make efficient use of energy provided by the pump.

Another object of the invention is to enable such a system to be compact.

Another object of the invention is to enable such a system to dispense with cryogenics for the laser target, in particular enabling the target of the system to lase at room temperature.

In accordance with these and other objects made apparent hereinafter, the invention encompasses a laser system having a target disposed within a laser cavity, and an optical pump for the target. The target has a crystal matrix containing holmium and thulium. The matrix is such that both the holmium and thulium are trivalent, giving rise to especially advantageous quantum states in the holmium and thulium. In particular embodiments the laser pump is itself a commercially available diode laser, which is inherently of high efficiency. Excited quantum states of the holmium and thulium cooperate such that the energy state in thulium excited by the laser diode pump crossrelaxes with another thulium atom so that, for each photon of the laser diode absorbed, two thulium atoms become excited. The excited quantum state of these two thulium atoms are very near in energy to a corresponding state available in the holmium atoms, the energy in the excited thulium eventually transfering to two holmiun atoms, which decay to generate photons usable in lasing. The target sample is preferrably an integral monolith, with the reflective surfaces that constitute the laser cavity being epitaxally grown on the laser sample itself.

The invention is more fully understood from the following detailed description of preferred embodiments, it being understood, however, that the invention is capable of extended application beyond the precise details of the preferred embodiments. Changes and modifications can be made that do not affect the spirit of the invention, nor exceeded its scope, as expressed in the appended claims. Accordingly, the invention is described with particular reference to the accompanying drawings, wherein,

DETAILED DESCRIPTION

Figure 1:
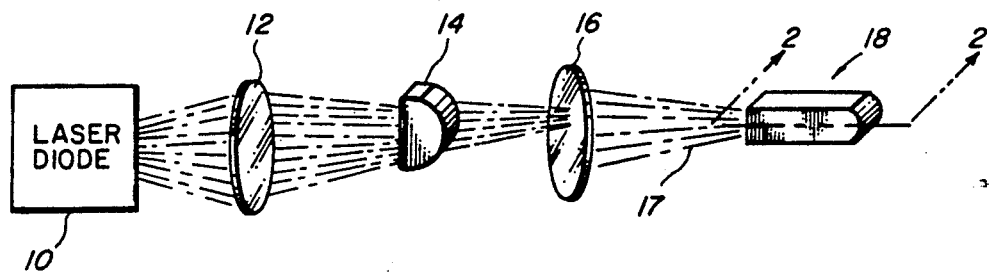
FIG. 1 is a schematic view of the laser system.

With reference with the drawing figures, and in particular FIG. 1, the overall laser system is seen with a laser diode 10 to provide pumping for the system. The diode 10, which preferably has an output at about 0.785 micrometer, is readily available commercially. The output of laser diode 10 is collected by lens 12, which can be, for example, a conventional objective lens with a focal distance of about 8 millimeters. The optical throughput from lens 12 is compressed vertically by cylindrical lens 14, and more narrowly focused by objective lens 16 onto laser target 18. Cylinderical lens 14 can, for example, have a focal length of approximately 500 millimeters, and objective lens 16 a focal length of approximately 25 millimeters. The precise construction of the various lenses intermediate laser diode 10 and laser target 18 is not critical, so long as the output of laser diode 10 is collected and concentrated sufficiently to produce appreciable power on target 18.

Figure 2:
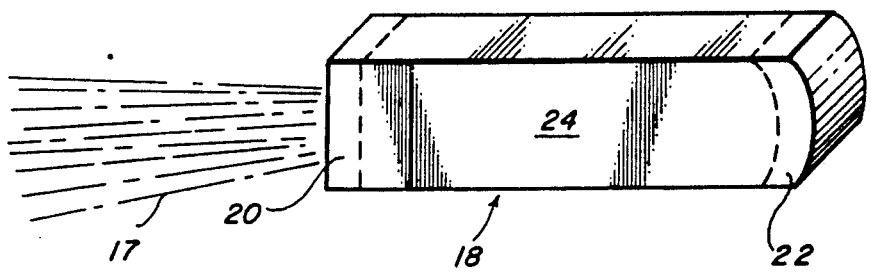
FIG. 2 is an elevational isometric view of the laser not to scale, viewed in the direction of lines 2—2 of FIG. 2.

With particular reference to FIG. 2, sample 18 has a laser target portion, i.e. an active lasing medium, 24 intermidiate of reflective surfaces 20, 22, the latter defining the laser cavity. Laser target portion 24 is preferably in the form of an yttrium-aluminum garnet crystal structure in which the yttrium is replaced in the garnet crystal by thulium and holmium. In such a crystal structure, thulium and holmium are trivalent, producing quantum energy levels of interest (for example, those energy levels illustrated in FIG. 3). The lower operative doping level of holmium and thulium is that which is sufficient to ensure communication among the quantum states of the holmium and thulium atoms in the garnet crystal. Although there is no upper limit of doping concentration, doping of holmium in target portion 24 is optimally as low as practical so as to lower the input power level at which lasing begins. The doping of thulium should be as high as practical to make energy transfer between laser diode 10 and the holmium efficient. A preferred concentration of holmium is from about 0.1 to about 0.4%, and thullium, about 4 to about 7%, and most preferred is about 0.36% and 5.7% respectively. Surfaces 20,22 can be in the form of thin multilayer optical films epitaxially grown on target 24. Such optical films are conventional and well known expedients for passing or rejecting (reflecting) selected optical frequencies or bands and are well understood by those skilled in this art. Surface 20, has a high optical reflectance for light of 2.1 micrometers wavelength, and high optical transmittance (typically 0.9) for the laser diode output of 0.785 micrometer. Surface 22 has a similarly high transmittance at 0.785 micrometer, but a higher transmittance at 2.1 micrometers (typically, about 0.005). Surface 18 is relatively flat so as to aid alignment of laser diode 10 and target portion 24, in particular that portion of target portion 24 in which exists whichever electromagnetic propagation mode is of interest (typically the TEM$_{00}$ mode). Surface 22 is concave so as to reflect radiation of about 2.1 micrometers back into target 24 and aid energy buildup in target portion 24. Although relatively flat, surface 22 also operates to reflect this radiation back into laser target 24, and is thus deemed concave also for purposes of nomenclature. The optimal length of target portion 24 is abnout 1 mm, and is determined by resolving conflicting considerations: The longer that target portion 24 is, the more energy from laser diode 24 will be absorbed, but also the greater the ground state absorption, which results in a loss for the system.

Figure 3:
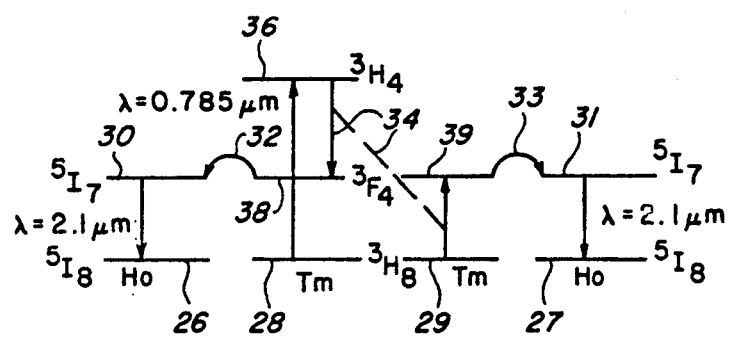
FIG. 3 is the laser system's pumping diagram, showing the quantum energy transitions of interest.

The operation of the laser system is best understood from FIGS. 1 and 2 viewed in conjunction with the energy level diagram of FIG. 3. Laser diode 10 and lenses 12, 14, 16 produce an intense optical flux at 0.785 micrometer wavelength incident upon reflective surface 20 of target 18. The high transmittance of surface 20 makes surface 20 virtually transparent to incident light flux 17, enabling optical flux 17 to enter laser sample 24. As seen in FIG. 3, photons of optical flux 17 having an energy corresponding to a wavelength of 0.785 micrometer cause thulium atoms in the garnet crystal of target 24 to undergo a transition from energy state 28 to energy state 36, these being respectively holmium's $^3H_6$ and $^3H_4$ states. (The upper left superscript is the spin multiplicity of the particular quantum state, which is equal to $2s+1$, s being the spin quantum number of the energy state; the lower right hand subscript is the total angular momentum of the state.) The excited state 36 decays by cross relaxation with a neighboring thulium atom, the energy in quantum state 36 being divided between energy level 39 of the neighboring thulium atom, and energy level 38 of the original thulium atom. In particular, excited state $^3H_4$ (36) relaxes by raising the neighboring thulium atom from the $^3H_6$ level to the $^3H_4$ (34, dotted line) and by relaxing to ist own $^3H_4$ level. Energy levels 38 and 39 are each the $^3F_4$ energy state of the respective thulium atoms, which are closely coupled to the $^5I_7$ energy level of holmium. As indicated by arrows 32,33, excited energy states 38, 39 cross couple to $^5I_7$ energy states of a respective pair of holmium atoms. Decay of states 30,31 produce the photons that generate lasing in the system, in particular photons corresponding to a wavelength of about 2.1 micrometers.

The high reflectance of surface 20,22 confine these 2.1 micrometers photons in target portion 24 between surfaces 20,22. The electromagnetic radiation thus confined becomes a standing wave between surfaces 20,22 which causes subsequent photon emission by target portion 24 at 2.1 micrometers to align in phase and direction with this standing wave, in accordance with well known laser principles. Because surface 22 has a slight transmittance at 2.1 micrometers, some of the energy confined between surfaces 20 and 22 will escape through surface 22. Upon the confined energy growing to a steady state magnitude, leakage through surface 22 constitutes the steady state output of the laser system. Because both surfaces 20 and 22 are transparent to the output of laser diode 10, the output from surface 22 should be filtered by a volume of germanium (not shown) which is opaque at 0.785 micrometer wavelength, but highly transmissive at 2.1 micrometers.

The invention has been shown in what is considered to be the most practical and preferred embodiments. It is recognized, however, that obvious modifications may occur to those with skill in this art. By way of example, those skilled in this art recognize that other crystal matrices can serve as the host for holmium and thulium in a manner to make each trivalent, and hence usable as laser targets in this system. A non-exhaustive list of other hosts for the thulium and holmium is: $Y_3Ga_3O_{12}$ (YGG), $YAlO_3$ (YALO), $Gd_3Sc_2Al_3O_{12}$ (GSGG), $Gd_3Sc_2Ga_3O_{12}$ (GSGG), $GdP_5O_{14}$, $GdScO_3$, $KY(WO_4)_2$, $LaCl_3$, $CaY_2Mg_2Ge_3O_{12}$, $BaMgGeO_7$ (BMAG), $CaY_4(SiO_4)_3O$, $Ca_5(PO_4)_3F$, $LaAlO_3$, $La_2Be_2O_5$, $Lu_3Al_5O_{12}$, $LuAlO_3$, $Lu_3Gd_5O_{12}$, $Lu_3Sc_2Al_3O_{12}$, $NaCaYF_6$, $La_2Be_2O_5$, $La_2O_2S$ $Gd_3Ga_3O_{12}$, $LaF_3$, $LiYF_4$, $CaWO_4$, $SrWO_4$, $WO_4$, $NaGd(Wo_4)_2$ $NaLa(WO_4)_2$, $LaNa(MoO_4)_2$, $Gd_2(MoO_4)_3$, $KY(MoO_4)_3$, $LaNbO_4$, $YVO_4$, $(Y,La)_3Al_5O_{12}$, $Y_2O_3$, $YP_5O_{14}$, $Y_3Sc_2Al_3O_{12}$, $Y_3Sc_2Ga_3O_{12}$, $YScO_3$, $ZrO_2$-$Y_2O_3$, $BaY_2F_8$, $LuAlO_3$, $LuAl_5O_{12}$, etc.

Accordingly, the scope of the invention is to be discerned solely from the appended claims, wherein:

What is claimed and desired to be secured by Letters Patent of the United States is:

1. A method of lasing at the 2.1 micrometer wavelength between the $^5I_7$ and $^5I_8$ energy levels of holmium, said method of lasing employing:
   a laser cavity containing a laser active material, said laser active material comprising a host lattice doped with thulium and holmium atoms, said host lattice being selected to cause said thulium and said holmium atoms to be trivalent; and
   a pumping means for pumping said laser active material substantially monochromatically at about 0.785 micrometer wavelength;
   wherein said method comprises steps for:
   using said pumping means to raise thulium atoms in said host lattice to the $^3H_4$ energy level by illuminating said host lattice with said photons of about 0.785 micrometer wavelength;
   relaxing, responsive to said illumination, each of said thulium atoms raised to said $^3H_4$ energy level by (a) cross-relaxing with an adjacent thulium atom to raise said adjacent thulium atom to the $^3F_4$ energy level, and (b) responsive to step (a) permitting said each of said thulium atoms at said $^3H_4$ energy level to relax to the $^3F_4$ energy level, thereby creating two thulium atoms at said $^3F_4$ energy level per photon at said 0.785 micrometer wavelength;
   causing said $^3F_4$ energy level of said thulium atoms, and said $^5I_7$ energy levels of said holmium atoms, to cooperate to excite a respective holmium atom to the $^5I_7$ energy level;
   relaxing said respective holmium atoms to the $^5I_8$ energy level by emitting said photon of about 2.1 micrometer wavelength;
   wherein, for each said photon of about 0.785 micrometer wavelength, said laser active material emits two of said photons of about 2.1 micrometer wavelength; and
   wherein said holmium is between 0.1 and 0.4 atomic per cent of said host lattice, and said thulium is between 4 and 7 atomic percent of said host lattice.

2. The method of claim 1, wherein said holmium is about 0.36 atomic per cent of said host lattice, and said thulium is about 5.7 atomic percent of said host lattice.

3. The method of claim 2, wherein said laser cavity is about one millimeter long.

4. A method of lasing at the 2.1 micrometer wavelength between the $^5I_7$ and $^5I_8$ energy levels of holmium, said method of lasing employing:

a laser cavity containing a laser active material, said laser active material comprising a host lattice doped with thulium and holmium atoms, said host lattice being selected to cause said thulium and said holmium atoms to be trivalent; and a pumping means for pumping said laser active material substantially monochromatically at about 0.785 micrometer wavelength;

wherein said method comprises steps for:

using said pumping means to raise thulium atoms in said host lattice to the $^3H_4$ energy level by illuminating said host lattice with said photons of about 0.785 micrometer wavelength;

relaxing, responsive to said illumination, each of said thulium atoms raised to said $^3H_4$ energy level by (a) cross-relaxing with an adjacent thulium atom to raise said adjacent thulium atom to the $^3F_4$ energy level, and (b) responsive to step (a) permitting said each of said thulium atoms at said $^3H_4$ energy level to relax to the $^3F_4$ energy level, thereby creating two thulium atoms at said $^3F_4$ energy level per photon at said 0.785 micrometer wavelength;

causing said $^3F_4$ energy level of said thulium atoms, and said $^5I_7$ energy levels of said holmium atoms, to cooperate to excite a respective holmium atom to the $^5I_7$ energy level;

relaxing said respective holmium atoms to the $^5I_8$ energy level by emitting said photon of about 2.1 micrometer wavelength;

wherein, for each said photon of about 0.785 micrometer wavelength, said laser active material emits two of said photons of about 2.1 micrometer wavelength wherein said host lattice is yttrium-aluminum garnet; and wherein said holmium is between 0.1 and 0.4 atomic per cent of said host lattice, and said thulium is between 4 and 7 atomic percent of said host lattice.

5. The method of claim 4, wherein said holmium is about 0.36 atomic per cent of said host lattice, and said thulium is about 5.7 atomic percent of said host lattice.

6. The method of claim 5, wherein said laser cavity is about one millimeter long.

7. A method of lasing at the 2.1 micrometer wavelength between the $^5I_7$ and $^5I_8$ energy levels of holmium, said method of lasing employing:

a laser cavity containing a laser active material, said laser active material comprising a host lattice having laser active doping, said doping consisting essentially of thulium and holmium atoms, said host lattice being selected to cause said thulium and said holmium atoms to be trivalent; and a pumping means for pumping said laser active material substantially monochromatically at about 0.785 micrometer wavelength;

wherein said method comprises steps for:

using said pumping means to raise thulium atoms in said host lattice to the $^3H_4$ energy level by illuminating said host lattice with said photons of about 0.785 micrometer wavelength;

relaxing, responsive to said illumination, each of said thulium atoms raised to said $^3H_4$ energy level by (a) cross-relaxing with an adjacent thulium atom to raise said adjacent thulium atom to the $^3F_4$ energy level, and (b) responsive to step (a) permitting said each of said thulium atoms at said $^3H_4$ energy level to relax to the $^3F_4$ energy level, thereby creating two thulium atoms at said $^3F_4$ energy level per photon at said 0.785 micrometer wavelength;

causing said $^3F_4$ energy level of said thulium atoms, and said $^5I_7$ energy levels of said holmium atoms, to cooperate to excite a respective holmium atom to the $^5I_7$ energy level;

relaxing said respective holmium atoms to the $^5I_8$ energy level by emitting said photon of about 2.1 micrometer wavelength;

wherein, for each said photon of about 0.785 micrometer wavelength, said laser active material emits two of said photons of about 2.1 micrometer wavelength;

wherein said holmium is between 0.1 and 0.4 atomic per cent of said host lattice, and said thulium is between 4 and 7 atomic percent of said host lattice.

8. The method of claim 7, wherein said host lattice is yttrium-aluminum garnet.

9. The method of claim 8, wherein said holmium is about 0.36 atomic per cent of said host lattice, and said thulium is about 5.7 atomic percent of said host lattice.

10. The method of claim 9, wherein said laser cavity is about one millimeter long.

11. The method of claim 7, wherein said holmium is about 0.36 atomic per cent of said host lattice, and said thulium is about 5.7 atomic percent of said host lattice.

12. A device for lasing at the 2.1 micrometer wavelength between the $^5I_7$ and $^5I_8$ energy levels of holmium, said device comprising:

a laser cavity containing a laser active material, said laser active material comprising a host lattice having laser active doping, said doping consisting essentially of thulium and holmium atoms, said host lattice being selected to cause said thulium and said holmium atoms to be trivalent;

wherein said holmium is between 0.1 and 0.4 atomic per cent of said host lattice, and said thulium is between 4 and 7 atomic percent of said host lattice.

13. The device of claim 12, wherein said host lattice is yttrium-aluminum garnet.

14. The device of claim 13, wherein said holmium is about 0.36 atomic per cent of said host lattice, and said thulium is about 5.7 atomic percent of said host lattice.

15. The device of claim 14, wherein said laser cavity is about one millimeter long.

16. The device of claim 12, wherein said holmium is about 0.36 atomic per cent of said host lattice, and said thulium is about 5.7 atomic percent of said host lattice.

* * * * *